Nov. 15, 1966    W. J. PELLOW ET AL    3,285,476
ROTATABLE INCLINED CHUTE FOR HANDLING STICKY BULK MATERIAL
Filed Aug. 20, 1965
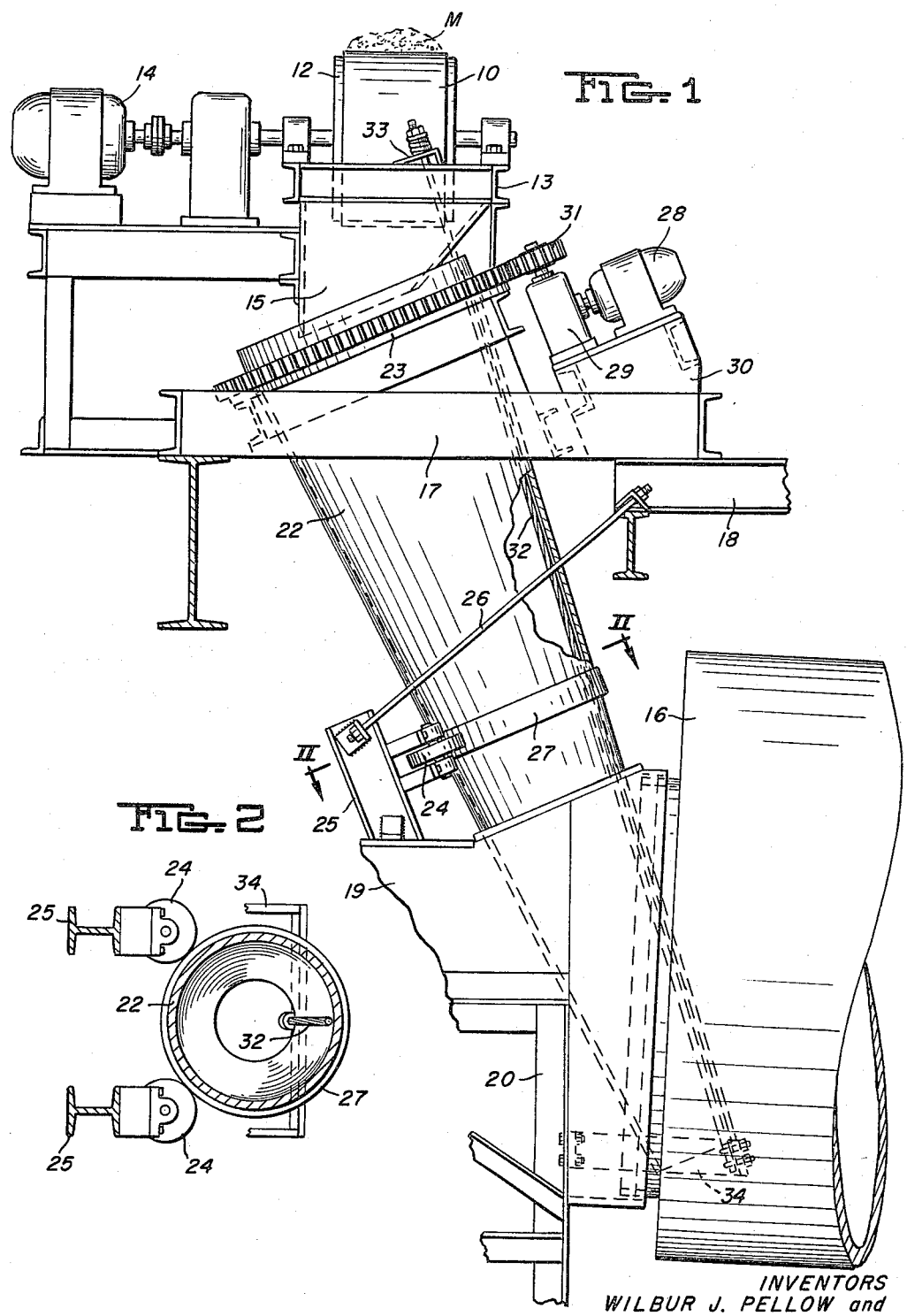
INVENTORS
WILBUR J. PELLOW and
LAWRENCE C. ROSENQUIST
By Donald G. Dalton
Attorney

United States Patent Office 3,285,476
Patented Nov. 15, 1966

3,285,476
ROTATABLE INCLINED CHUTE FOR HANDLING STICKY BULK MATERIAL
Wilbur J. Pellow and Lawrence C. Rosenquist, Duluth, Minn., assignors to United States Steel Corporation, a corporation of Delaware
Filed Aug. 20, 1965, Ser. No. 481,289
2 Claims. (Cl. 222—168)

This invention relates to an improved chute construction for transferring sticky bulk material.

Although the invention is not thus limited, one application in which our chute construction is particularly useful is in feeding taconite concentrate from a conveyor belt to a rotary kiln. This material is exceedingly fine (90 percent minus 200 mesh) and it contains 8 to 10 percent moisture. As a result, it is sticky and tends to plug the chute which feeds it to the kiln for nodulizing. Nevertheless it is apparent our invention can be used elsewhere and for handling other materials where similar problems are encountered.

An object of the invention is to provide an improved chute construction which can carry sticky material, such as taconite concentrate, without plugging.

A more specific object is to provide a chute which is conical and continuously rotates as it delivers material, and which is equipped with means for scraping any clinging material from its inside surface.

In the drawing:

FIGURE 1 is a side elevational view of our improved chute construction, along with typical environmental structure; and FIGURE 2 is a section on line II—II of FIGURE 1.

FIGURE 1 shows the discharge end of a conventional conveyor belt 10, which runs over a pulley 12 journaled on a frame 13 and driven by a motor 14. The belt delivers bulk material M to a short length fixed feed chute 15 supported on frame 13. The figure also shows the feed end of a conventional rotary kiln 16 adapted to receive material from the belt, and a number of surrounding structural members 17, 18, 19 and 20. The foregoing parts furnish a typical environment in which our improved chute construction can be used, but per se are not part of the invention.

Our improved chute construction includes a downwardly tapered truncated hollow cone 22 of sheet metal. The cone is journaled near its upper end in a bearing 23 supported on the structural member 17. The intermediate portion of the cone rides on guide rollers 24 journaled on brackets 25 upstanding from the structural member 19. Preferably we connect tie rods 26 between the structural member 18 and the upper end of brackets 25. Preferably also the outside of the cone carries a wear ring 27 where it rides against rollers 24. The cone is equipped with a drive means for continuously rotating it about its central axis. The drive illustrated includes a motor 28 and a right angle speed reducer 29, which are supported on a base 30 on the structural members 17, and a pinion and gear 31 connecting the speed reducer and cone, but obviously many equivalents are possible.

In the installation illustrated, we position the cone so that its larger upper end receives material M discharging from belt 10 through the feed chute 15 and its smaller lower end lies within kiln 16. The central axis of the cone is inclined about 25° to the vertical, but of course these details may vary. We mount a scraper in a position to contact the inside surface of the cone along or near the uppermost line of its circumference. The scraper is in the form of a tensioned wire rope 32. We attach the upper end of this rope to a bracket 33 mounted on the conveyor frame 13, and the lower end to a bracket 34 extending into the kiln from the structural member 20.

In operation, the drive motor 28 continuously rotates cone 22 as material M feeds through the cone. Such rotation tends to drop material from the upper part of the cone circumference and keeps the material moving toward the kiln 16. The scraper 32 contacts the inside surface of the cone and breaks loose any clinging material which does not otherwise fall. Thus the chute transfers material from the belt to the kiln without likelihood of plugging.

While we have shown and described only a single embodiment of our invention, it is apparent that modifications may arise. Therefore, we do not wish to be limited to the disclosure set forth but only by the scope of the appended claims.

We claim:

1. A chute construction comprising a hollow truncated cone, means supporting said cone for rotation about its central axis, with the smaller end of the cone directed downwardly, and with the central axis of the cone sloping from the vertical, drive means operatively connected with said cone for effecting rotation thereof, fixed support means outside said cone at opposite ends thereof, and a tensioned wire rope attached at its ends to said fixed support means and contacting the inside surface of said cone along the uppermost line of its circumference, said rope acting as a scraper to remove material clinging to the inside surface of the cone and allowing such material to drop gravitationally toward the central axis of the cone.

2. The combination, with a conveyor belt for delivering sticky bulk material and a rotary kiln positioned below the discharge end of said belt for receiving the material, of a chute construction for transferring material from said belt to said kiln, said construction comprising a hollow truncated cone, means supporting said cone for rotation about its central axis with the larger end of the cone directed upwardly and positioned to receive material discharging from said belt and with the smaller end of the cone directed downwardly and positioned to deliver material to said kiln, the central axis of the cone sloping from the vertical, drive means operatively connected with said cone for effecting rotation thereof, fixed support means outside said cone at opposite ends thereof, and a tensioned wire rope attached at its ends to said fixed support means and contacting the inside surface of said cone along the uppermost line of its circumference, said rope acting as a scraper to remove material clinging to the inside surface of the cone to drop gravitationally toward the central axis of the cone and thence into said kiln.

References Cited by the Examiner

UNITED STATES PATENTS

| 2,781,952 | 2/1957 | Mahoney | 222—168 |
| 2,813,822 | 11/1957 | Collier | 214—18 |
| 2,962,172 | 11/1960 | Fath et al. | 198—47 X |
| 3,057,454 | 10/1962 | Frasch et al. | 198—45 |

FOREIGN PATENTS 855,677  11/1952  Germany.

ANDRES H. NIELSEN, Primary Examiner.

EVON C. BLUNK, Examiner.

A. L. LEVINE, Assistant Examiner.